United States Patent
Schoen

(10) Patent No.: US 12,197,644 B2
(45) Date of Patent: *Jan. 14, 2025

(54) LOOK TO PIN ON AN ARTIFICIAL REALITY DEVICE

(71) Applicant: Meta Platforms Technologies, LLC, Menlo Park, CA (US)

(72) Inventor: Hayden Schoen, Evanston, IL (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,436

(22) Filed: Oct. 17, 2023

(65) Prior Publication Data

US 2024/0061502 A1 Feb. 22, 2024

Related U.S. Application Data

(63) Continuation of application No. 17/826,964, filed on May 27, 2022, now Pat. No. 11,829,529.

(60) Provisional application No. 63/221,114, filed on Jul. 13, 2021.

(51) Int. Cl.
*G06F 3/01* (2006.01)
*G06F 3/04815* (2022.01)

(52) U.S. Cl.
CPC .......... *G06F 3/013* (2013.01); *G06F 3/04815* (2013.01)

(58) Field of Classification Search
CPC .......... G06F 3/013; G06F 3/011; G06F 3/017; G06F 3/04815; G06F 3/012; G06F 3/0481

See application file for complete search history.

(56) References Cited

U.S. PATENT DOCUMENTS

| | | |
|---|---|---|
| 10,948,997 B1 | 3/2021 | Victor-Faichney et al. |
| 11,188,156 B2 | 11/2021 | Victor-Faichney et al. |
| 11,829,529 B2 * | 11/2023 | Schoen .................. G06F 3/0481 |
| 2009/0103780 A1 | 4/2009 | Nishihara et al. |
| 2012/0249797 A1 | 10/2012 | Haddick et al. |
| 2014/0211995 A1 | 7/2014 | Model |
| 2014/0347391 A1 | 11/2014 | Keane et al. |

(Continued)

OTHER PUBLICATIONS

International Search Report and Written Opinion for International Application No. PCT/US2022/036878, mailed Oct. 21, 2022, 13 pages.

*Primary Examiner* — Nelson M Rosario
*Assistant Examiner* — Scott D Au
(74) *Attorney, Agent, or Firm* — Potomac Law Group, PLLC; Dannon G. Allbee

(57) ABSTRACT

When a notification is to be shown, an artificial reality notification system can add the notification to a pre-defined location in the user's field of view (e.g., top, side, or bottom) where it stays as a head leashed virtual object until the user's gaze is direct to the notification. When the user's gaze is directed at the notification, the artificial reality notification system can make the notification world locked, allowing the user to move her head to bring the notification to the center of her field of view, move closer to the notification to make it larger, move around the notification to see aspects from different angles, etc. The notification can be dismissed if the user never directs her gaze at it for a first threshold amount of time or when the user looks away from the world-locked version for a second threshold amount of time.

19 Claims, 16 Drawing Sheets

(56) References Cited

U.S. PATENT DOCUMENTS

| | | |
|---|---|---|
| 2014/0368535 A1 | 12/2014 | Salter et al. |
| 2015/0156803 A1 | 6/2015 | Ballard et al. |
| 2015/0179147 A1 | 6/2015 | Rezaiifar et al. |
| 2016/0049013 A1 | 2/2016 | Tosas Bautista |
| 2017/0003750 A1 | 1/2017 | Li |
| 2019/0213792 A1 | 7/2019 | Jakubzak et al. |
| 2019/0302895 A1 | 10/2019 | Jiang et al. |
| 2020/0193649 A1 | 6/2020 | Moon et al. |
| 2020/0272231 A1 | 8/2020 | Klein et al. |
| 2021/0034152 A1 | 2/2021 | Klingström et al. |
| 2021/0191523 A1 | 6/2021 | Victor-Faichney et al. |

\* cited by examiner

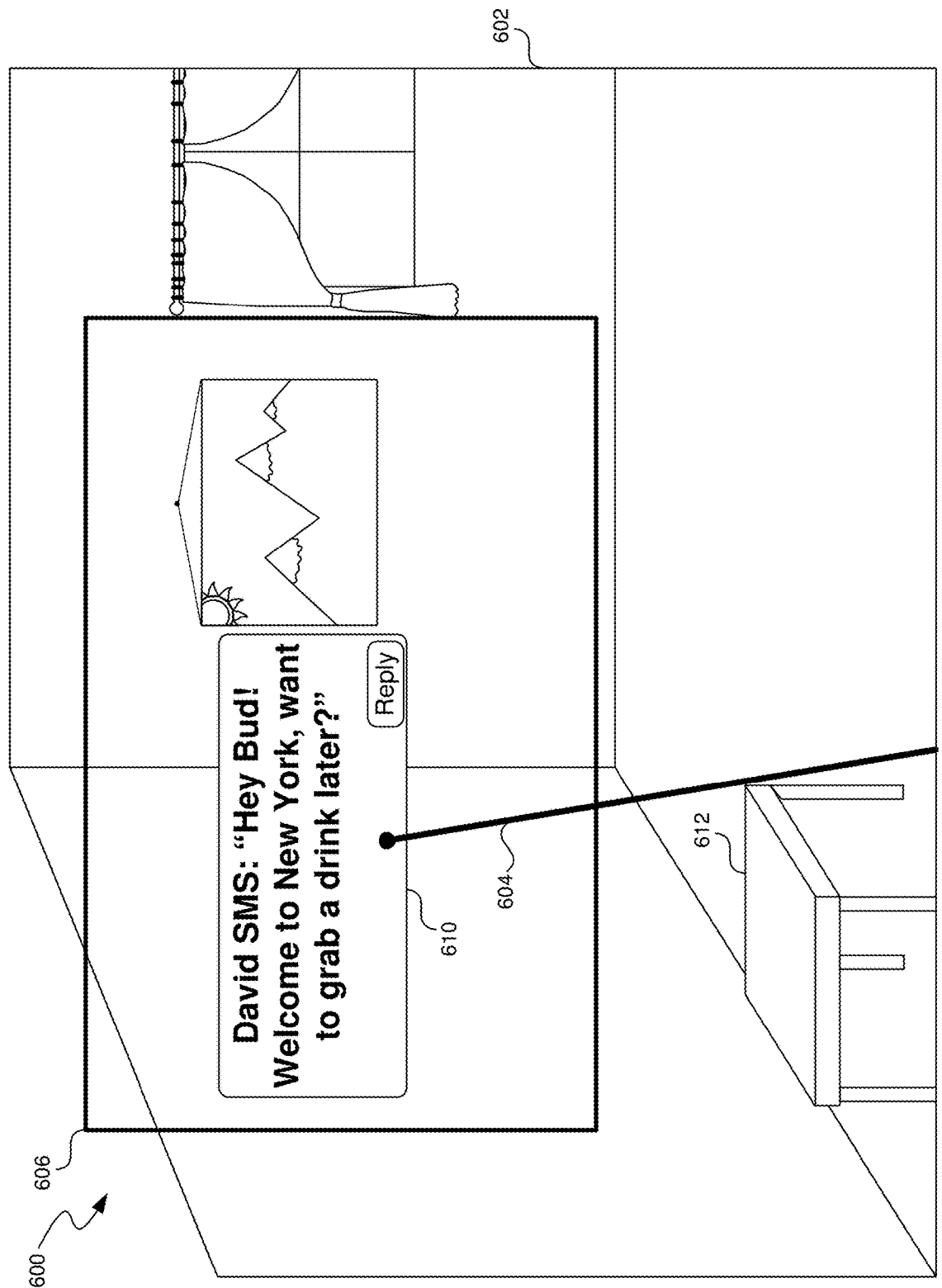

LOOK TO PIN ON AN ARTIFICIAL REALITY DEVICE

RELATED APPLICATIONS

This application is a continuation of U.S. patent application Ser. No. 17,826,964, filed on May 27, 2002, which claims priority to U.S. Provisional Patent Application No. 63/221,114, filed on Jul. 134, 2021, both of which are incorporated herein by reference.

TECHNICAL FIELD

The present disclosure is directed to a look to pin user interaction modality on an artificial reality device that facilitates information presentation and reduces eye strain.

BACKGROUND

Various objects in an artificial reality environment are "virtual objects," i.e., representations of objects generated by a computing system that appear in the environment. Virtual objects in an artificial reality environment can be presented to a user by a head-mounted display, a mobile device, a projection system, or another computing system. Some virtual objects can be notifications, such as system notifications, communication notifications, alarms, notifications from running applications, notifications from remote sources, etc. Existing artificial reality systems tend to display notifications over the middle of the display area or in a corner, regardless of the context or user's actions.

BRIEF DESCRIPTION OF THE DRAWINGS

FIGS. 6A-6G are conceptual diagrams illustrating an example of a notification presented in a look to pin interaction modality.

The techniques introduced here may be better understood by referring to the following Detailed Description in conjunction with the accompanying drawings, in which like reference numerals indicate identical or functionally similar elements.

DETAILED DESCRIPTION

Figure 1:
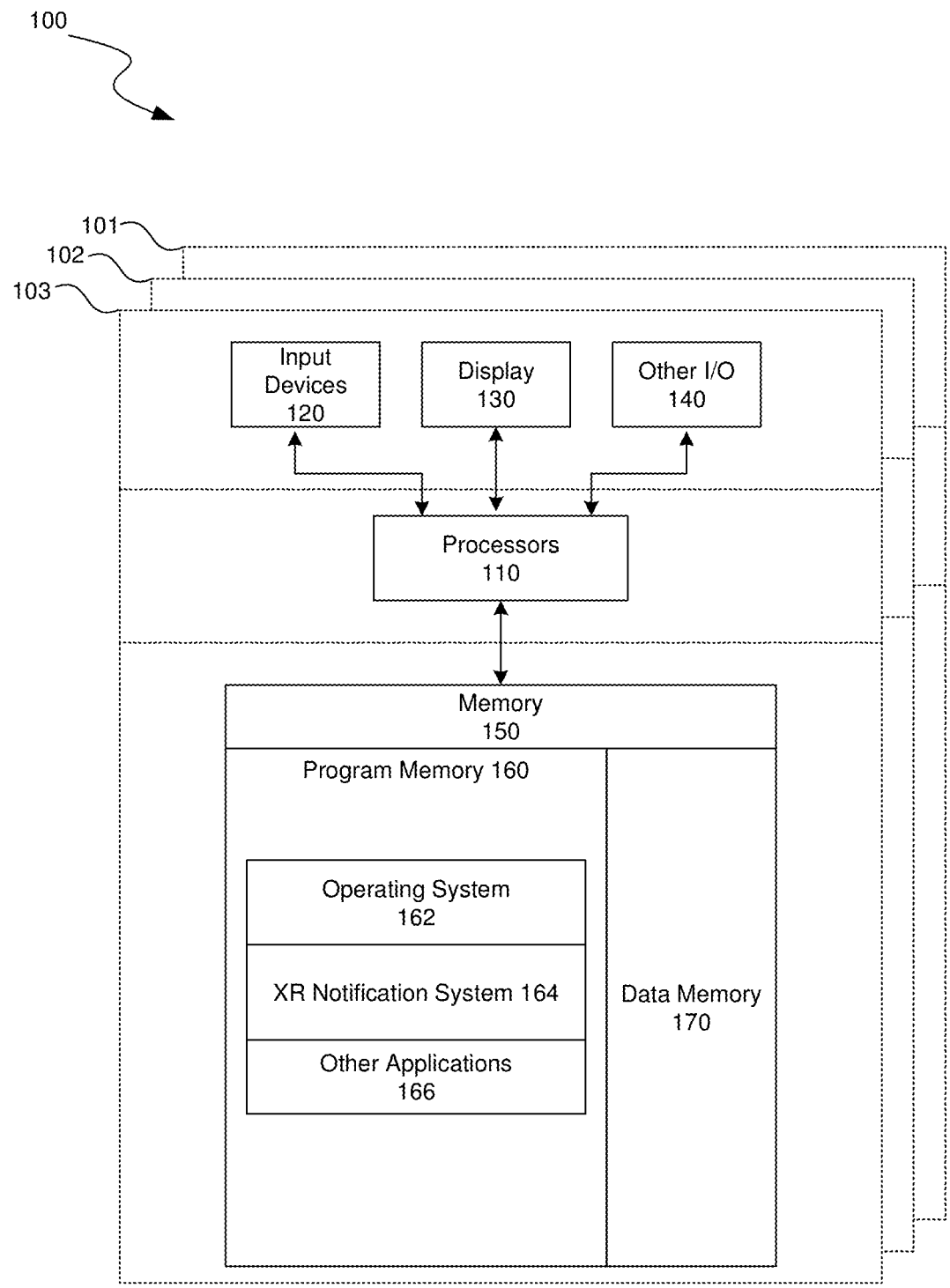
FIG. 1 is a block diagram illustrating an overview of devices on which some implementations of the present technology can operate.

Aspects of the present disclosure are directed to an artificial reality notification system that can implement a look to pin interaction modality for notifications. When a notification is to be shown, the artificial reality notification system can add it to a pre-defined location in the user's field of view (e.g., top, side, bottom, corner, etc.) where it stays as a head leashed virtual object until the user's gaze is direct to the notification. A "head leashed" virtual object is one that stays in the same place in the user's field of view, no matter how the user moves her head or moves about an artificial reality environment. When the user's gaze is detected to be directed at the notification, the artificial reality notification system can make the notification world locked, allowing the user to move her head to bring the notification to the center of her field of view (or in some cases automatically moving it initially to the user's center of her field of view), and in some cases to move closer to the notification to make it larger, move around the notification to see aspects from different angles, etc. A "world locked" virtual object is one the artificial reality device modifies the virtual object as a user moves her head or moves about an artificial reality environment to make the virtual object appear as if it is staying in the same geographical position despite the user's movements. An object that is fully world locked (i.e., six-degree-of-freedom, or 6DoF, world locked) appears to the user to stay in the same location in the world both as the user rotates her head and as she moves laterally (i.e., parallel to the floor). An object can also be three-degree-of-freedom, or 3DoF, world locked, where the object appears to the user to stay in the same location in the world both as the user rotates her head, but does not appear to change in distance to the user as she moves laterally. Thus, in various implementations, when the user's gaze is detected to be directed at the notification, the artificial reality notification system can make the notification either 3DoF or 6DoF world locked, allowing the user to move her head to bring the notification within her field of view (or in some cases automatically moving it initially to the user's center of her field of view). In the 3DoF world locked version, the user's apparent distance and angle to the notification will stay the same as she moves closer to/farther from the notification or moves around the notification. In the 6DoF world locked version, the user's apparent distance and angle to the notification will be adjusted as she moves closer to closer to/farther from the notification or moves around the notification. The notification can be dismissed if the user never directs her gaze at it for a first threshold amount of time or when the user looks away from the world-locked version for a second threshold amount of time.

In an example of the disclosed technology, an artificial reality notification system, integrated into an artificial reality device, can receive a notification that a text message has arrived. The artificial reality notification system can format the notification as a minimized version and display it as head leashed at the top of the user's field of view. When the user looks at the minimized version of the notification by directing her eyes to the top of her field of view, the artificial reality notification system locks the notification in place as a world locked object and maximizes it. This allows the user to then lift her head to bring the notification to the center of her field of view and move closer to it to enlarge it— eliminating the eye strain that would have been involved with reviewing the notification while attached to the top of her field of view. Once the user has completed her review of the world locked notification, she can direct her gaze away from it for two seconds, at which point the notification is closed from the user's field of view.

While the description of the artificial reality notification system and related systems and methods refer to "notifications" throughout this disclosure, in each instance the disclosed technology can equally be used with other, non-notification, content items. For example, the artificial reality notification system can provide output using the look to pin interaction modality from a minimized drafting application, for directions from a wayfinding application, of a minimized view of an audio or video call, etc. Thus, where "notification" is used in this disclosure, it will be understood that any other type of content item can be substituted.

In some implementations, when there are a maximum number of virtual objects in a user's field of view (or locked into that field of view) or a maximum amount of the user's field of view is taken up by virtual objects (or locked into that field of view), then the artificial reality notification system can A) minimize some of the virtual objects (e.g., replacing them with smaller versions or icon-only versions), which can include keeping them in their locked position or moving them to a side or corner of the user's field of view, or 2) remove the virtual objects from the artificial reality environment and move an indication of the virtual objects to a separate interface, such as a launcher panel that the user can bring up and dismiss at will. Thus, such virtual object qualifications can prevent visual overload by virtual objects, allowing the user to continue to see the real world and to have access to more important virtual objects without overcrowding.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

In existing artificial reality systems, notifications and similar content can be intrusive as they're often locked to the center of the user's field of view. In other existing artificial reality systems, content is locked to the edge of the user's field of view, but this causes eye strain as the user is required to direct her gaze to the edge of her field of view for an extended period while reviewing the notification. The disclosed artificial reality notification system and related methods are expected to solve these problems with existing artificial reality systems by providing a look to pin user interaction modality that facilitates less intrusive information presentation and reduces eye strain. By presenting notifications or other content items initially as head leashed to a particular field of view location, such as an edge, the artificial reality notification system provides notifications that are minimally intrusive to the user. Further, by locking the notification or other content items in place upon detecting the user's gaze upon it, the artificial reality notification system provide a mechanism that brings the notification into a more prominent and natural viewing location, improving access for interactions with the notification or content items and reducing eye strain.

Several implementations are discussed below in more detail in reference to the figures. FIG. 1 is a block diagram illustrating an overview of devices on which some implementations of the disclosed technology can operate. The devices can comprise hardware components of a computing system 100 that can implement a look to pin interaction modality for notifications. In various implementations, computing system 100 can include a single computing device 103 or multiple computing devices (e.g., computing device 101, computing device 102, and computing device 103) that communicate over wired or wireless channels effects to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory.

Memory 150 can include program memory 160 that stores programs and software, such as an operating system 162, artificial reality notification system 164, and other application programs 166. Memory 150 can also include data memory 170 that can include maximized and minimized versions of notifications, timer threshold values, defined notification pinning anchor points, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
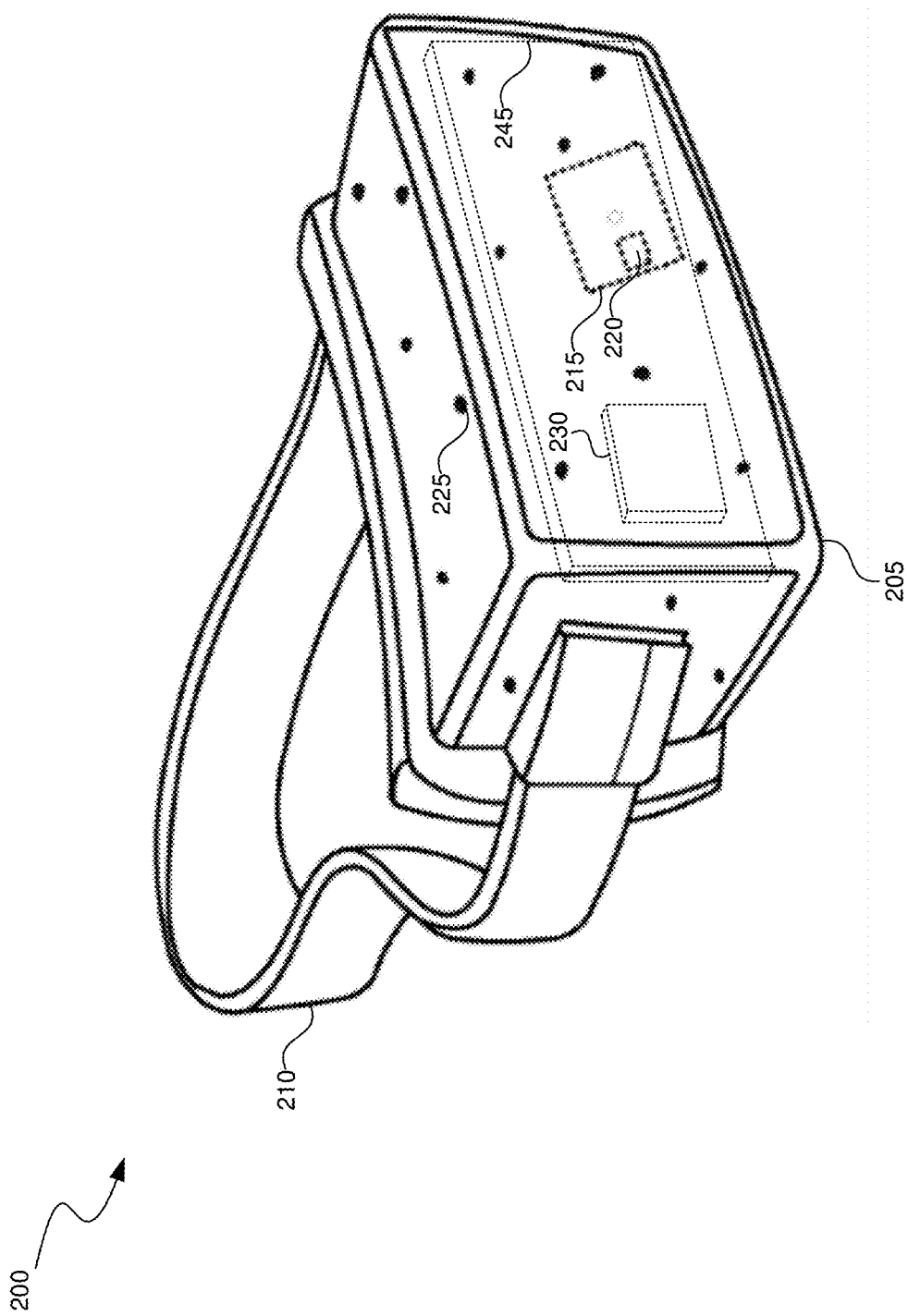
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
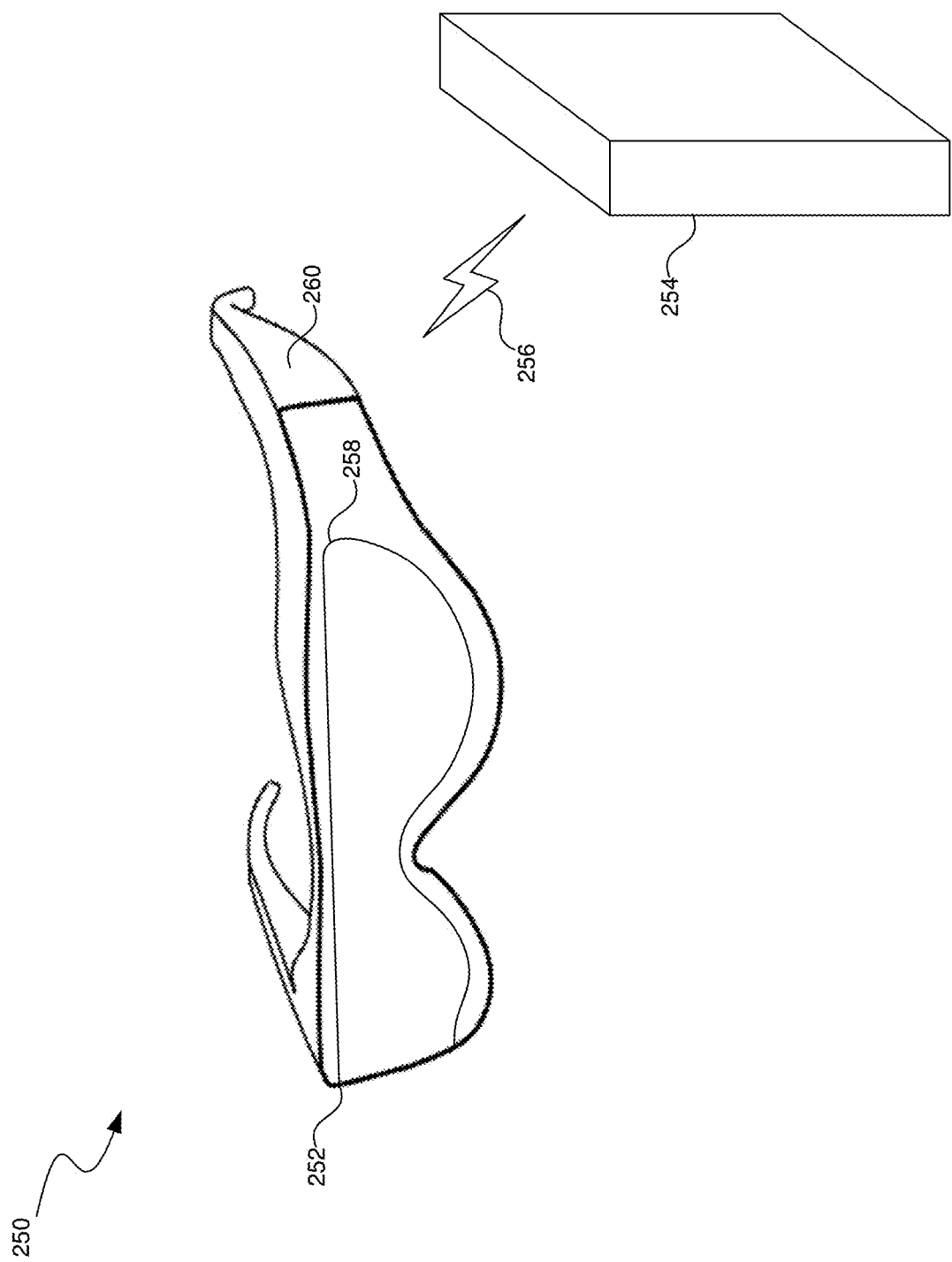
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
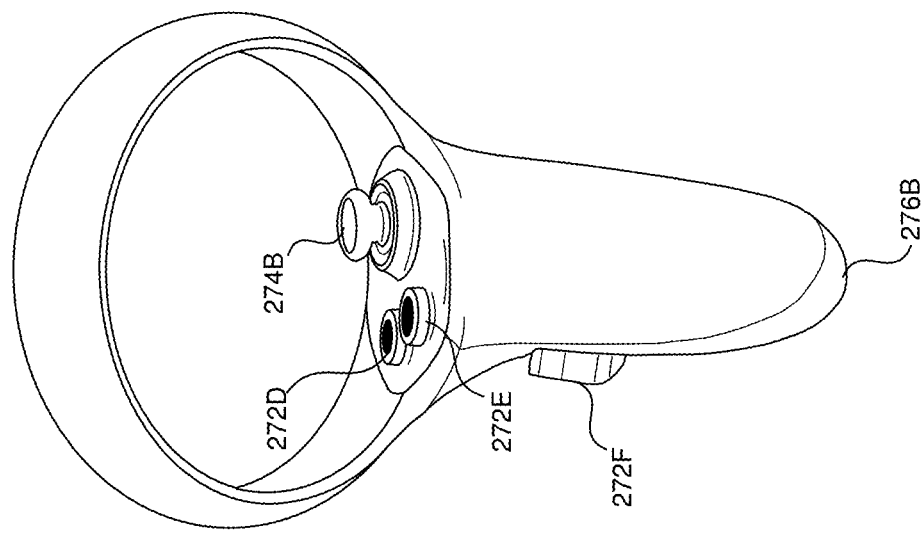
FIG. 2C is a wire diagram illustrating controllers which, in some implementations, a user can hold in one or both hands to interact with an artificial reality environment.
Figure 2C:
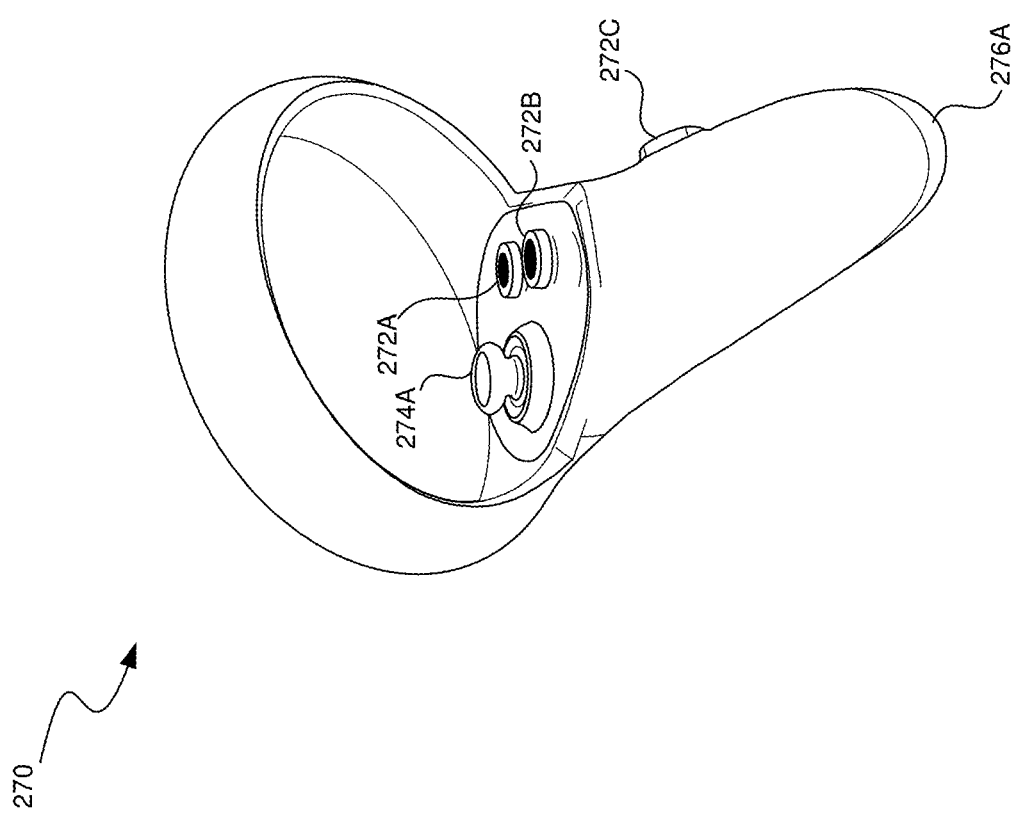

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
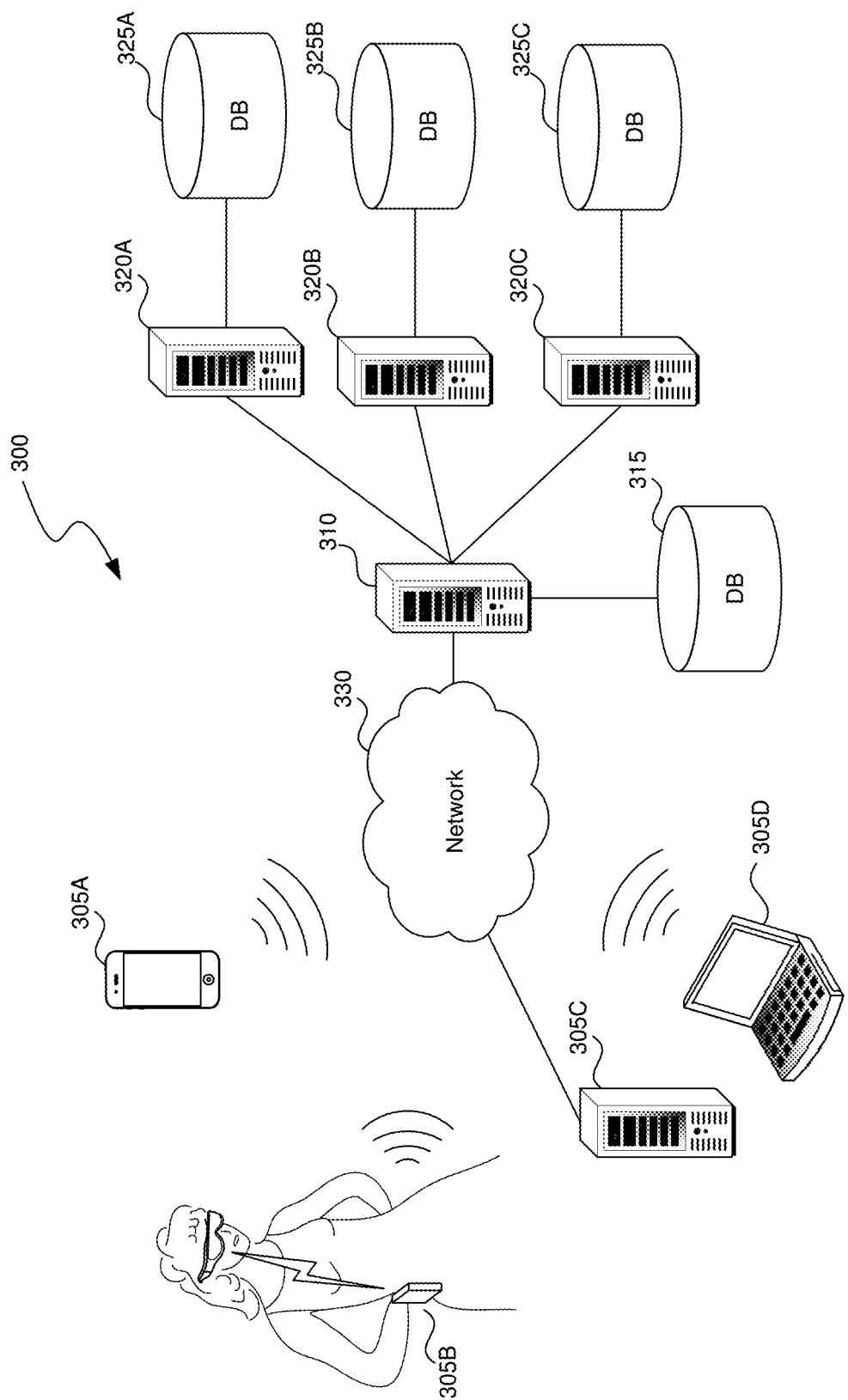
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
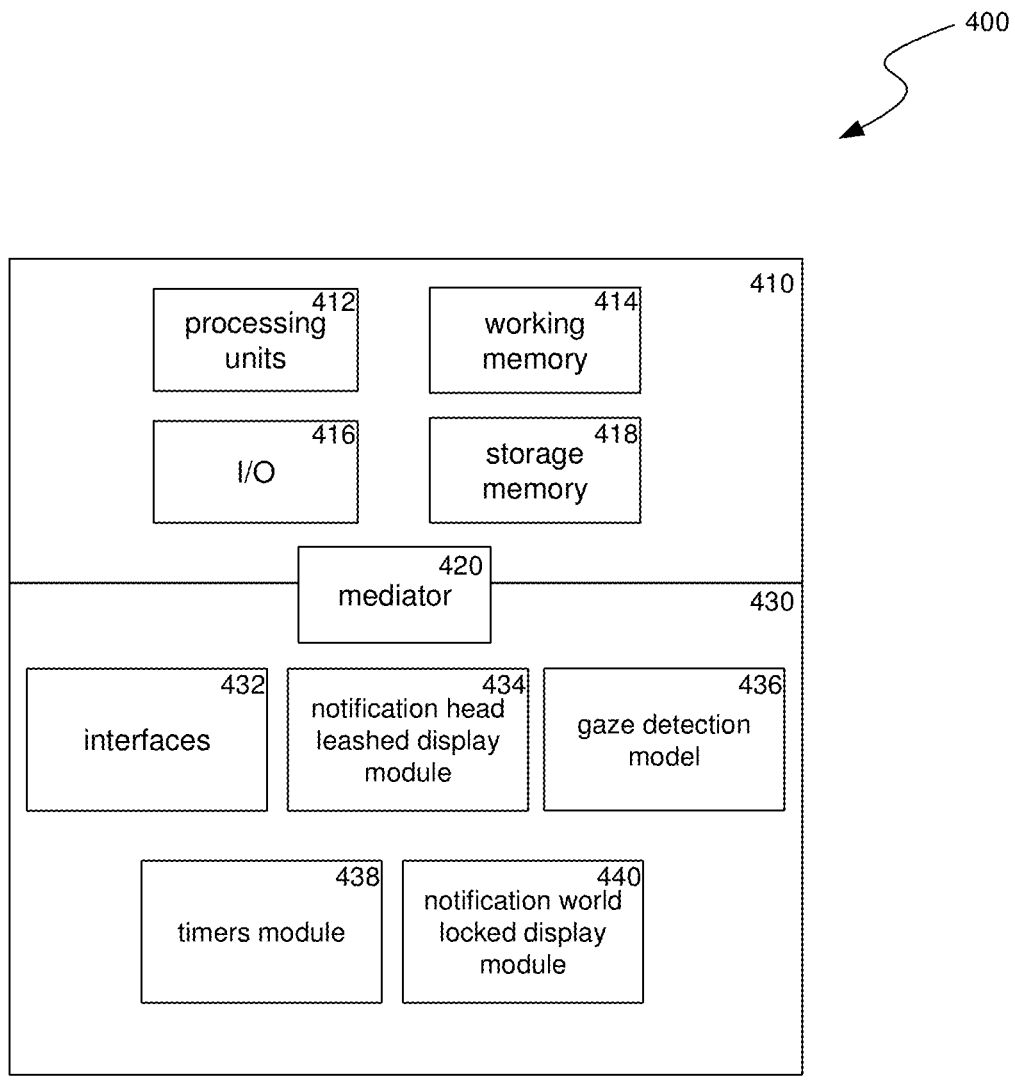
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for implementing a look to pin interaction modality for notifications. Specialized components 430 can include a notification head leashed display module 434, a gaze detection model 436, a timers module 438, a notification world locked display module 440, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The notification head leashed display module 434 can format a received notification to be output, in a minimized version, consistently at a pre-defined location in a user's field of view (i.e., as head leashed). Additional details on formatting a minimized notification and displaying it as head leashed are provided below in relation to block 502 of FIG. 5.

The gaze detection model 436 can track a user's gaze to determine whether the user is currently looking at a version of the notification displayed by the notification head leashed display module 434 or the notification world locked display module 440. In various implementations, gaze detection model 436 can use images or other sensor input, from devices of I/O 416, to identify an eye orientation (e.g., based on light reflected around the cornea of the user's eye). Based on this eye orientation, the gaze detection model 436 can extrapolate at which part of an artificial reality device display a user is looking.

The timers module 438 can determine, based on the gaze tracked by gaze detection model 436, whether gaze timers have expired for amounts of time the user has been looking at or looking away from a displayed notification. In one instance, the timers module 438 can determine whether the user has not looked at the notification for a first threshold amount of time, causing the notification to be dismissed. In another instance, the timers module 438 can determine whether the user has looked at the notification for a second threshold amount of time, causing the notification to be world locked and/or maximized. In yet another instance, the timers module 438 can determine whether the user has looked away from the notification for a third threshold amount of time, causing the notification to be minimized or dismissed. Additional details on checking threshold amounts of time for controlling notification display are provided below in relation to blocks 504, 508, and 512 of FIG. 5.

The notification world locked display module 440 can format a received notification to be output, in a maximized version, such that it appears as if it is in the same geographical position despite the user's movements (i.e., as world locked). In various implementations, the notification can either be 3DoF or 6DoF world locked, allowing the user to move her head to bring the notification within her field of view (or in some cases automatically moving it initially to the user's center of her field of view). In the 3DoF world locked version, the user's apparent distance and angle to the notification will stay the same as she moves closer to/farther from the notification or moves around the notification. In the 6DoF world locked version, the user's apparent distance and angle to the notification will be adjusted as she moves closer to closer to/farther from the notification or moves around the notification. Additional details on formatting a maximized notification and displaying it as world locked are provided below in relation to block 510 of FIG. 5.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
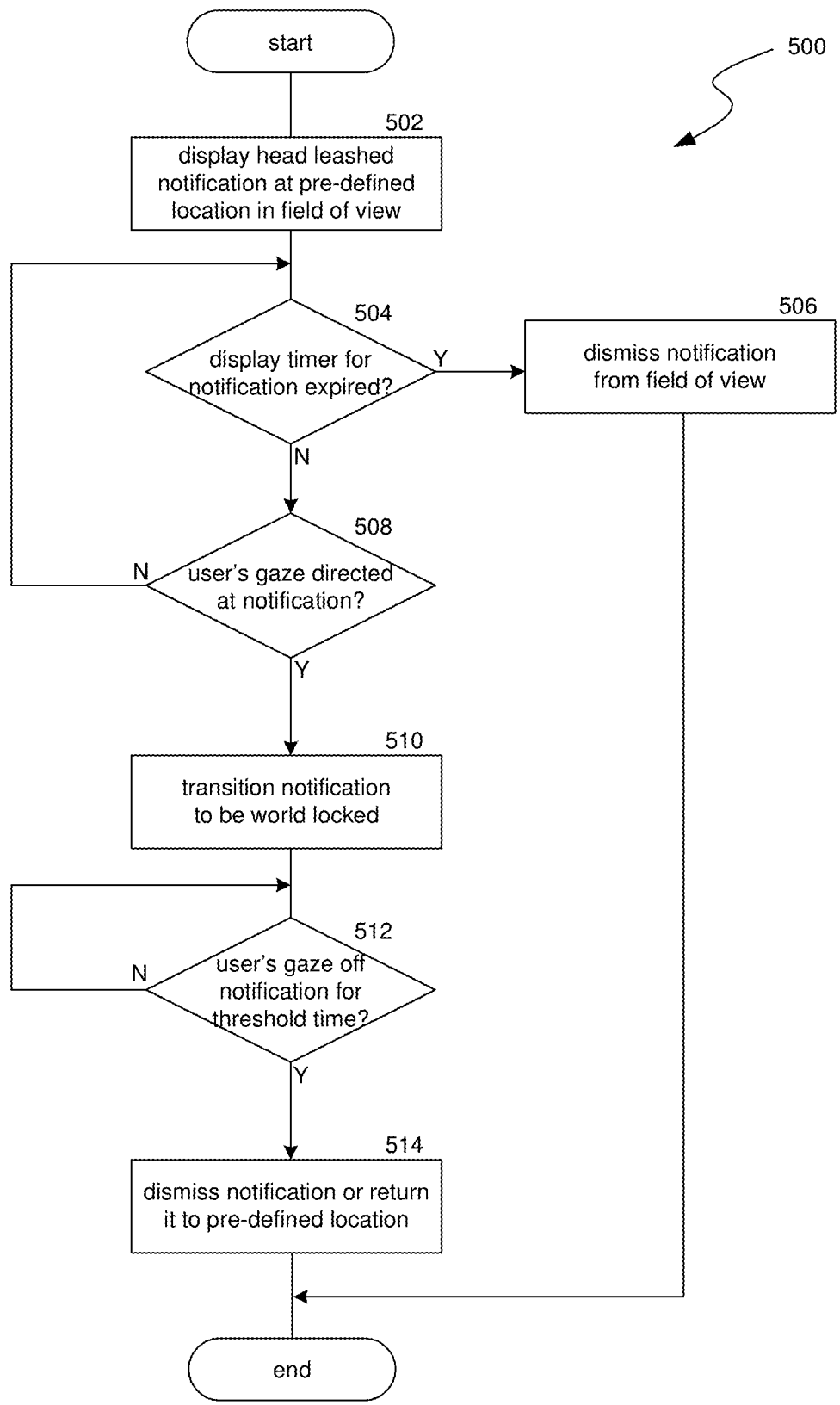
FIG. 5 is a flow diagram illustrating a process used in some implementations of the present technology for a look to pin interaction modality for notifications.

FIG. 5 is a flow diagram illustrating a process 500 used in some implementations of the present technology for a look to pin interaction modality for notifications. In some implementations, process 500 can be performed by an artificial reality system, e.g., as part of the execution of an operating system, a shell application controlling an artificial reality environment, or another application executed by the artificial reality system in control of providing notifications. In some implementations, process 500 can be performed in response to receiving a notification or other content item for display in the artificial reality environment.

At block 502, process 500 can display a head leashed notification at a pre-defined location in an artificial reality device's field of view. The pre-determined location can, in various implementations, be a place on the edge or in a corner of the field of view. In some cases, the head leashed notification can be a minimized version of the notification, which may be a set minimized notification size or particular shape and may provide an indication of the notification e.g., specifying a user and/or application source of the notification, a preview of the content of the notification, a time associated with receipt of the notification, controls for responding to or dismissing the notification, etc. As discussed above, the notification being head leashed can include keeping the notification at the same place in the user's field of view as the user moves about in the artificial reality environment.

At block 504, process 500 can determine whether a display timer for the notification has expired. The display timer can be a threshold amount of time (e.g., 3, 5, or 10 seconds) to display the head leashed notification, before it is dismissed, if the notification does not become the subject of the user's gaze at block 508. If the display timer has expired, process 500 can proceed to block 506 where the head leashed version of the notification can be removed from the field of view before process 500 ends. If the display timer has not expired, process 500 can proceed to block 508.

At block 508, process 500 can determine whether a tracked user's gaze is directed to the head leashed notification in the field of view. As discussed above, an artificial reality device can model a user's eye position. Based on this eye position, a line can be determined connecting the center of the user's cornea to the back of the user's retina to determine where on a display the user is looking. At block 508, process 500 can determine whether the endpoint of this line, on the display, has corresponded with the head leashed notification for a threshold amount of time (e.g., one or two seconds). If not, process 500 can return to block 504. If so, process can continue to block 510.

At block 510, process 500 can transition the notification to be world-locked. In some implementations, at block 510, process 500 can also reformat the notification, e.g., showing a maximized version, such as a version including more of a message from the notification, additional graphics or 3D models included in the notification, additional controls or input fields for responding to the notification, etc. In some cases, process 500 can automatically move the notification to the center of the user's field of view. When the user's gaze is detected to be directed at the notification, process 500 can make the notification either 3DoF or 6DoF world locked, allowing the user to move her head to bring the notification within her field of view (if it was not automatically moved to the center of the user's field of view). In the 3DoF world locked version, the user's apparent distance and angle to the notification will stay the same as she moves closer to/farther from the notification or moves around the notification. In the 6DoF world locked version, the user's apparent distance and angle to the notification will be adjusted as she moves closer to closer to/farther from the notification or moves around the notification. Thus in both the 3Dof and 6DoF world locked versions, the user can move the notification in her field of view (e.g., can move the notification closer to the center of the field of view by directing her head toward the world locked location of the notification). In the 6DoF version, the user can also A) see the notification from different angles as the user moves around the world locked location of the notification, and/or B) make the notification appear larger or smaller by moving closer or further from the world locked location of the notification. The user may also be able to interact with various controls provided with the world locked version of the notification, such as a message reply control, a notification dismiss control, a control to open the corresponding application, etc.

Process 500 can keep the notification in the world locked state until, at block 512, process 500 determines that the tracked user's gaze has moved off the notification for a threshold amount of time (e.g., one or two seconds). When process 500 makes this determination, process 500 can continue to block 514 where, in some implementations, it can remove the notification from the field of view and, in other implementations, it can return to block 502, to minimize, head leash, and restore the notification to the pre-defined location. Unless process 500 returned to block 502, after block 514, process 500 can end.

Figure 6A:
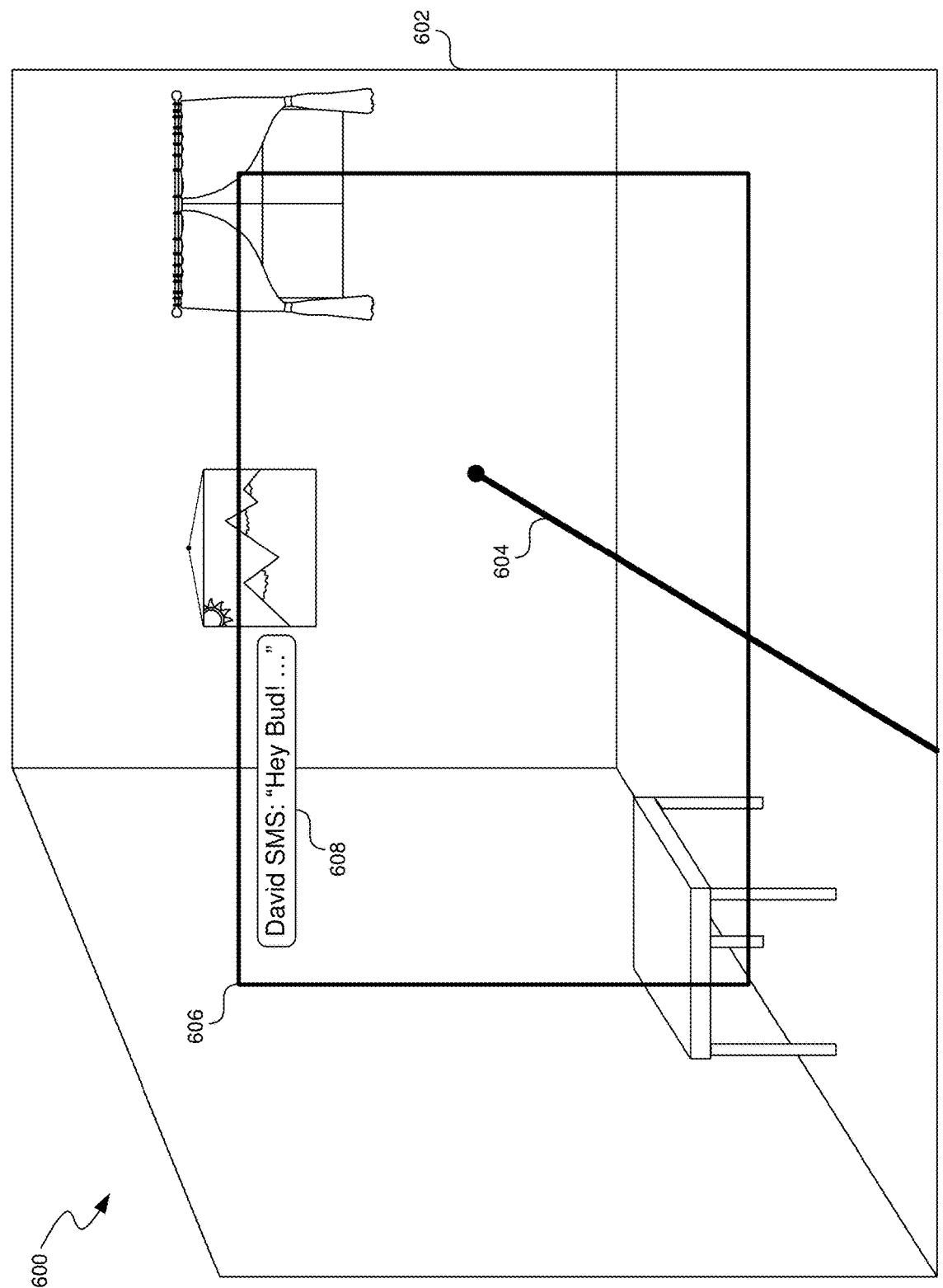
Figure 6B:
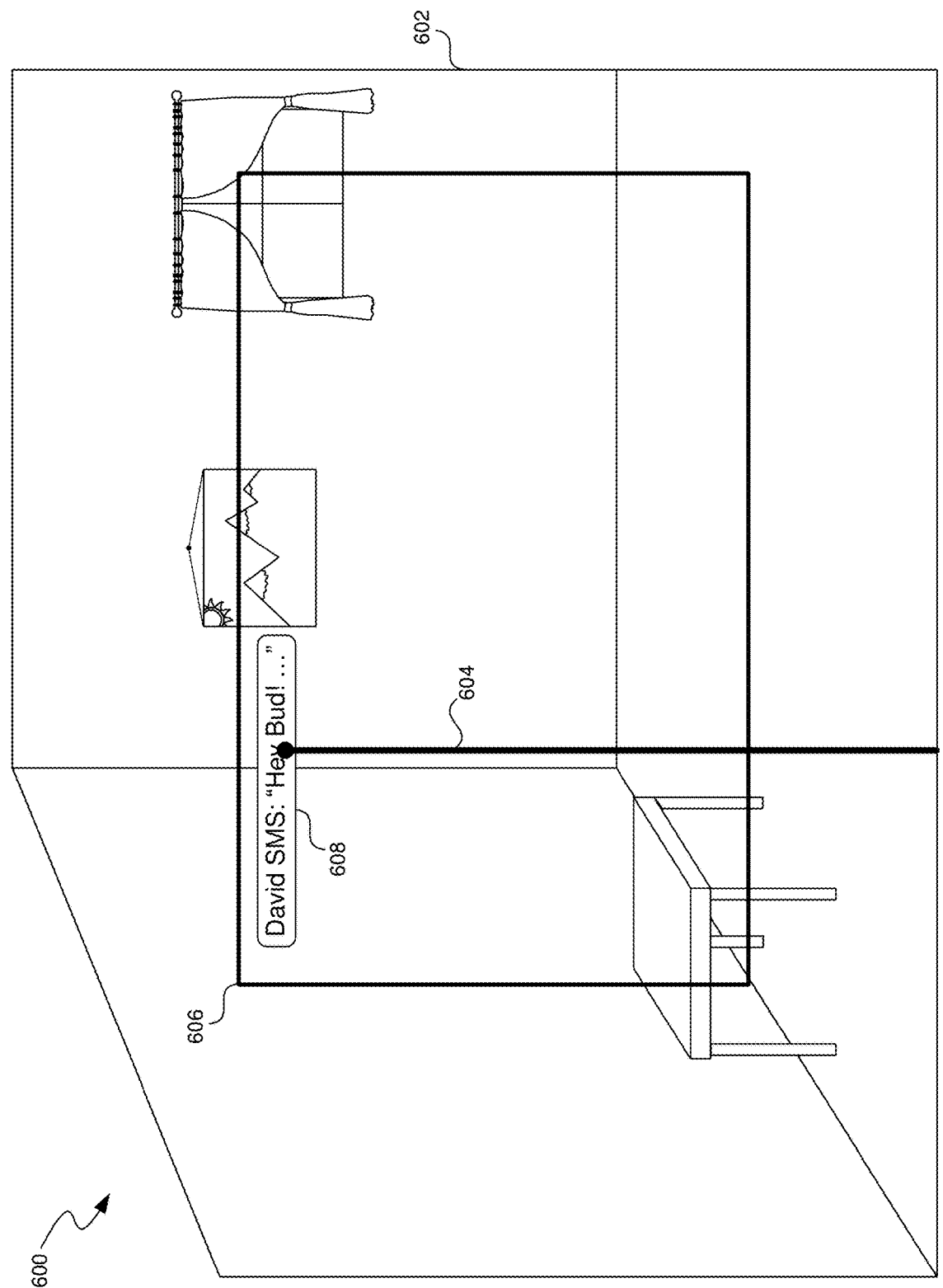
Figure 6C:
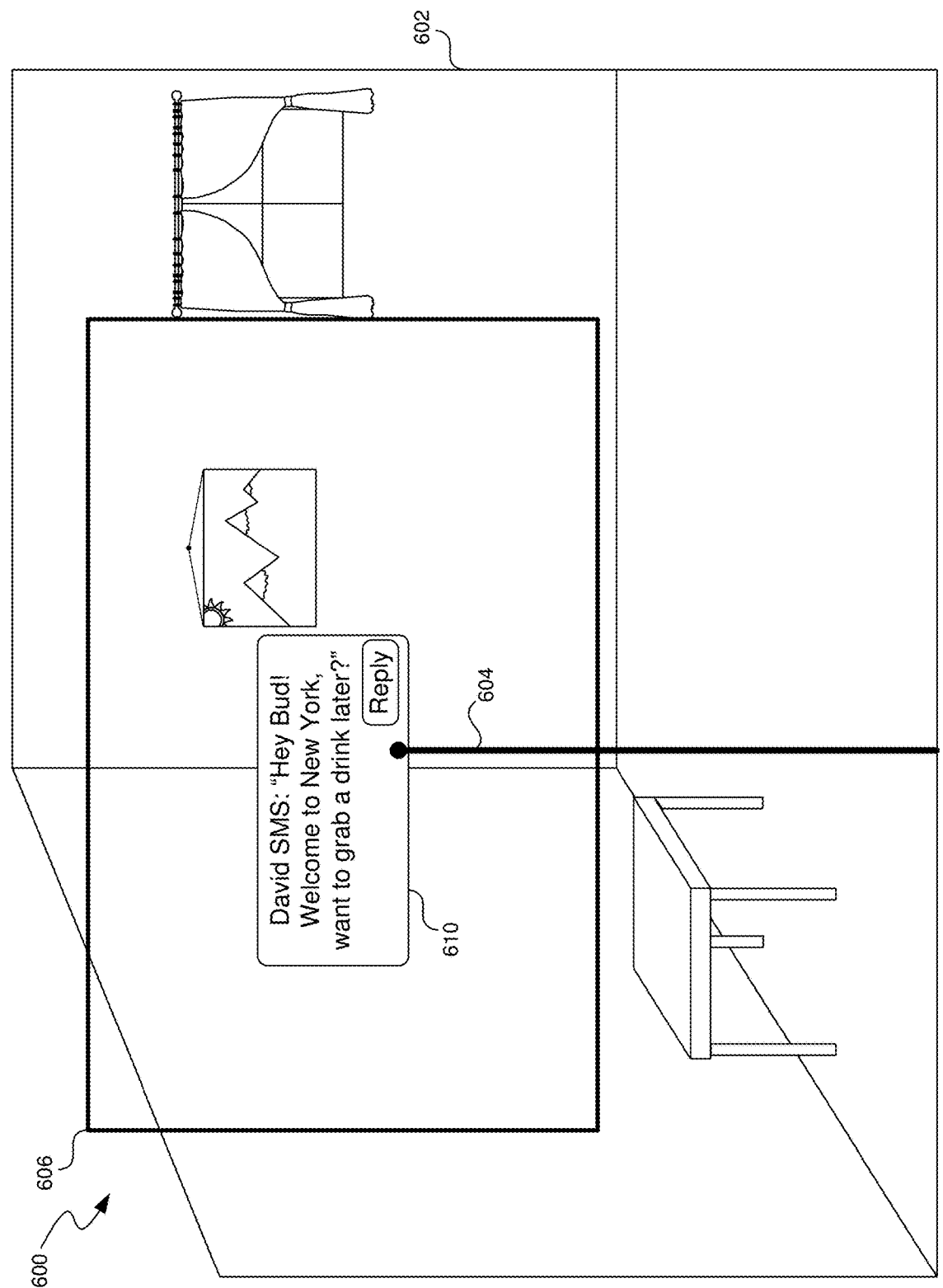
Figure 6E:
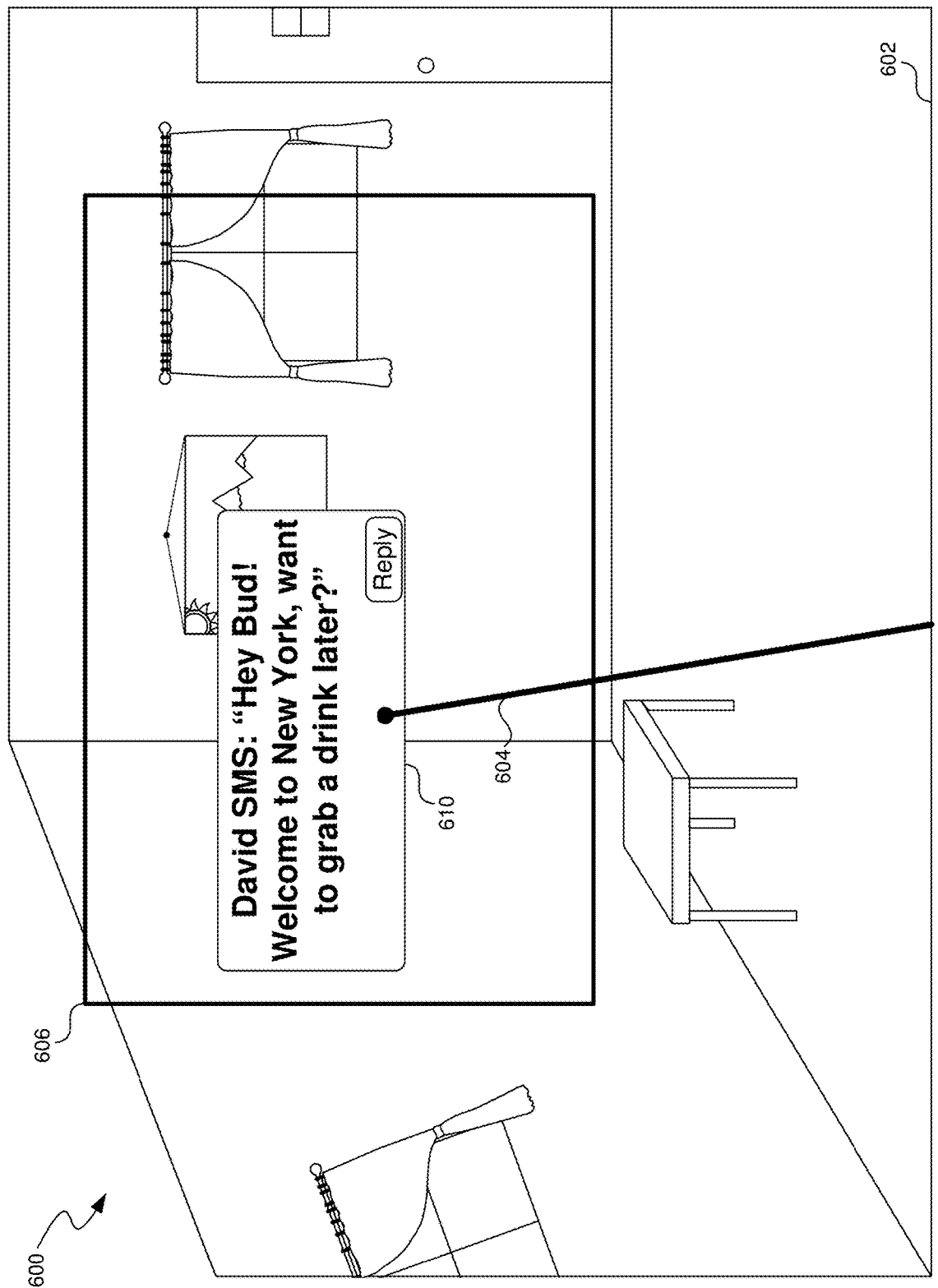
Figure 6F:
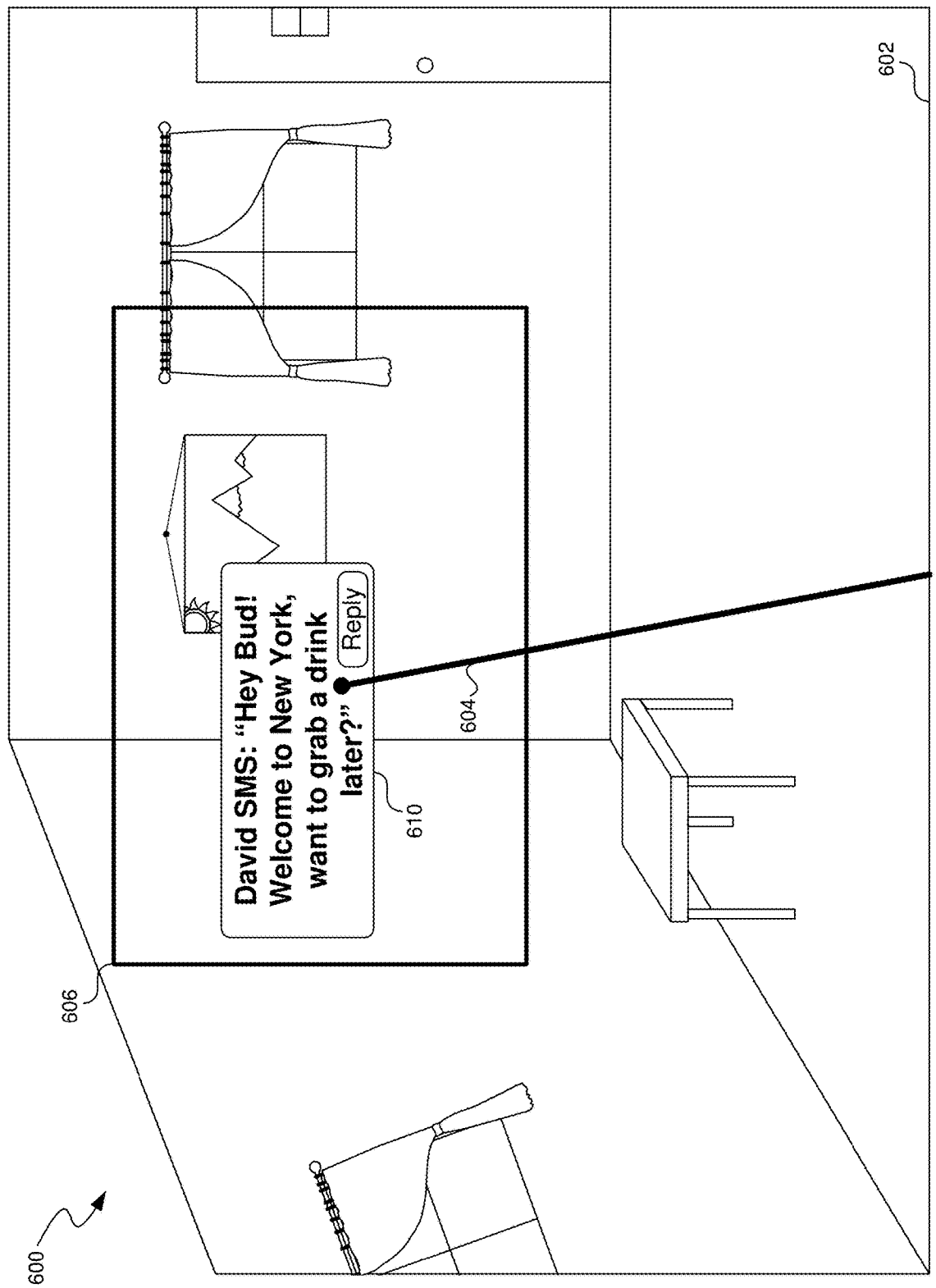
Figure 6G:
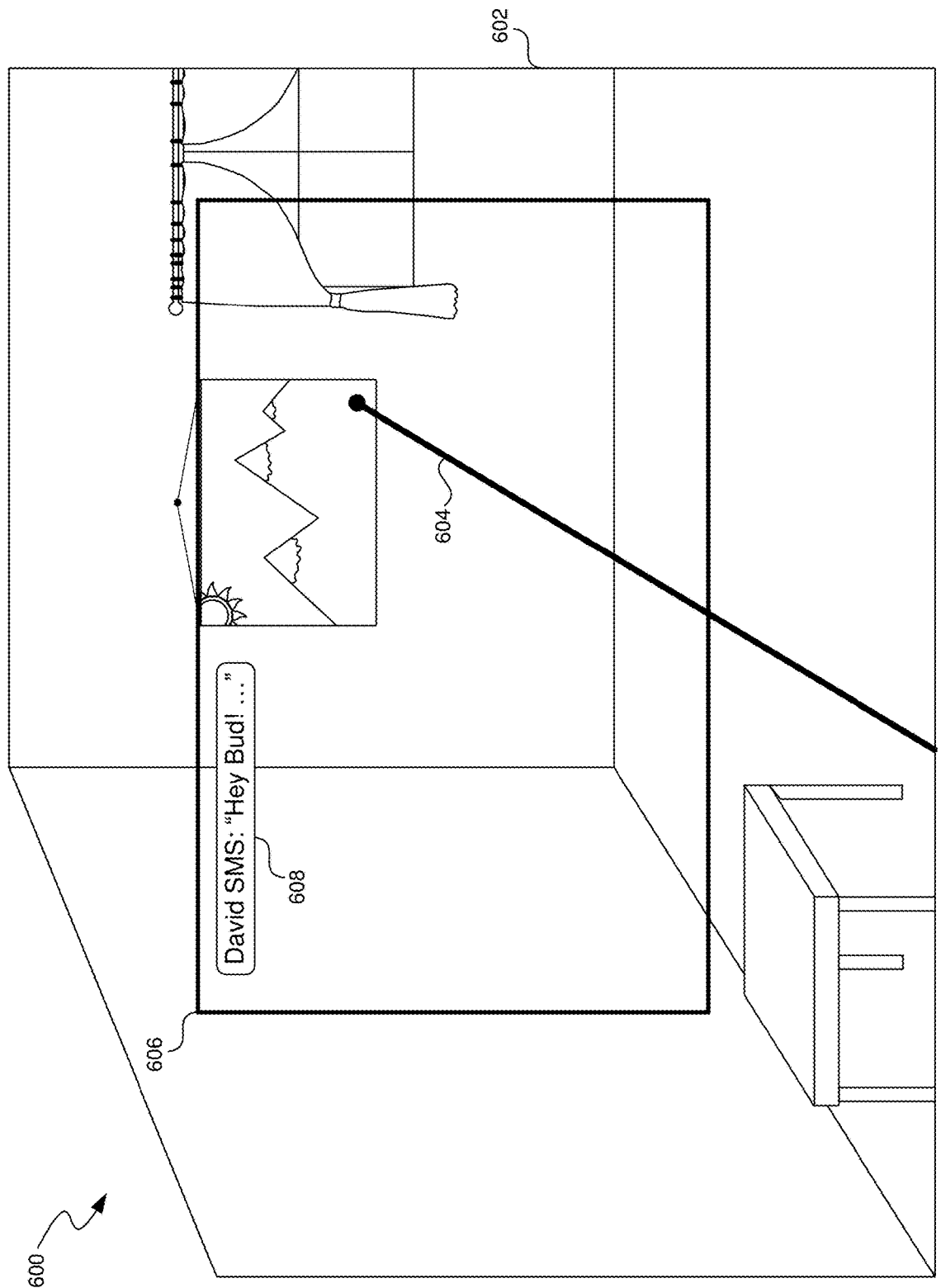

FIGS. 6A-6G are conceptual diagrams illustrating an example 600 of a notification presented in a look to pin interaction modality. Example 600 beings in FIG. 6A where a user is in an environment 602. The user's gaze direction 604 is being tracked by an artificial reality notification system. The user's field of view into the environment 602 is shown by rectangle 606. A notification about a received text message has come into the artificial reality notification system, which has formatted it as a minimized version 608 indicating a sender of the text message and a preview of the content of the text message. The minimized version 608 is head leashed to be shown in the top, left corner of the field of view 606. Continuing example 600 in FIG. 6B, the tracked direction 604 of the user's gaze is identified as being pointed at the minimized version 608 of the notification. Next, in FIG. 6C, example 600 illustrates, in response to the tracked direction 604 of the user's gaze having lingered on the notification for 1.5 seconds, the artificial reality notification system replaces the minimized version 608 with a maximized version 610 of the notification. The maximized version 610 includes the full text message and a control for replying to the text message. The maximized version 610 is world locked where it was when it was maximized, in this case over the table 612. Continuing to FIG. 6D, example 600 further illustrates a 6DoF world locked implementation where the user has moved closer to the world locked position of the maximized version 610 of the notification, causing the maximized version 610 to appear larger. FIGS. 6F and 6G illustrate alternate versions of the maximized version 610 of the notification being world locked in 3DoF (FIG. 6E) and 6DoF (FIG. 6F). In both FIGS. 6F and 6G, the user has moved away from the maximized version 610 of the notification. With the maximized version 610 of the notification being 3DoF world locked in FIG. 6E, the size of the maximized version 610 of the notification stays the same (as compared to FIG. 6D) as the user moves backward. With the maximized version 610 of the notification being 6DoF world locked in FIG. 6F, the user moving backward causes the size of the maximized version 610 of the notification to be decreased (as compared to FIG. 6D). Finally, in FIG. 6G, example 600 illustrates that the user has moved back to her original position and the tracked direction 604 of the user's gaze is identified as being pointed away from the maximized version 610 of the notification for two seconds, and in response, the artificial reality notification system returns the notification to be the minimized version 608 of the notification, again head leashed to the top left corner of the field of view 606.

Figure 7A:
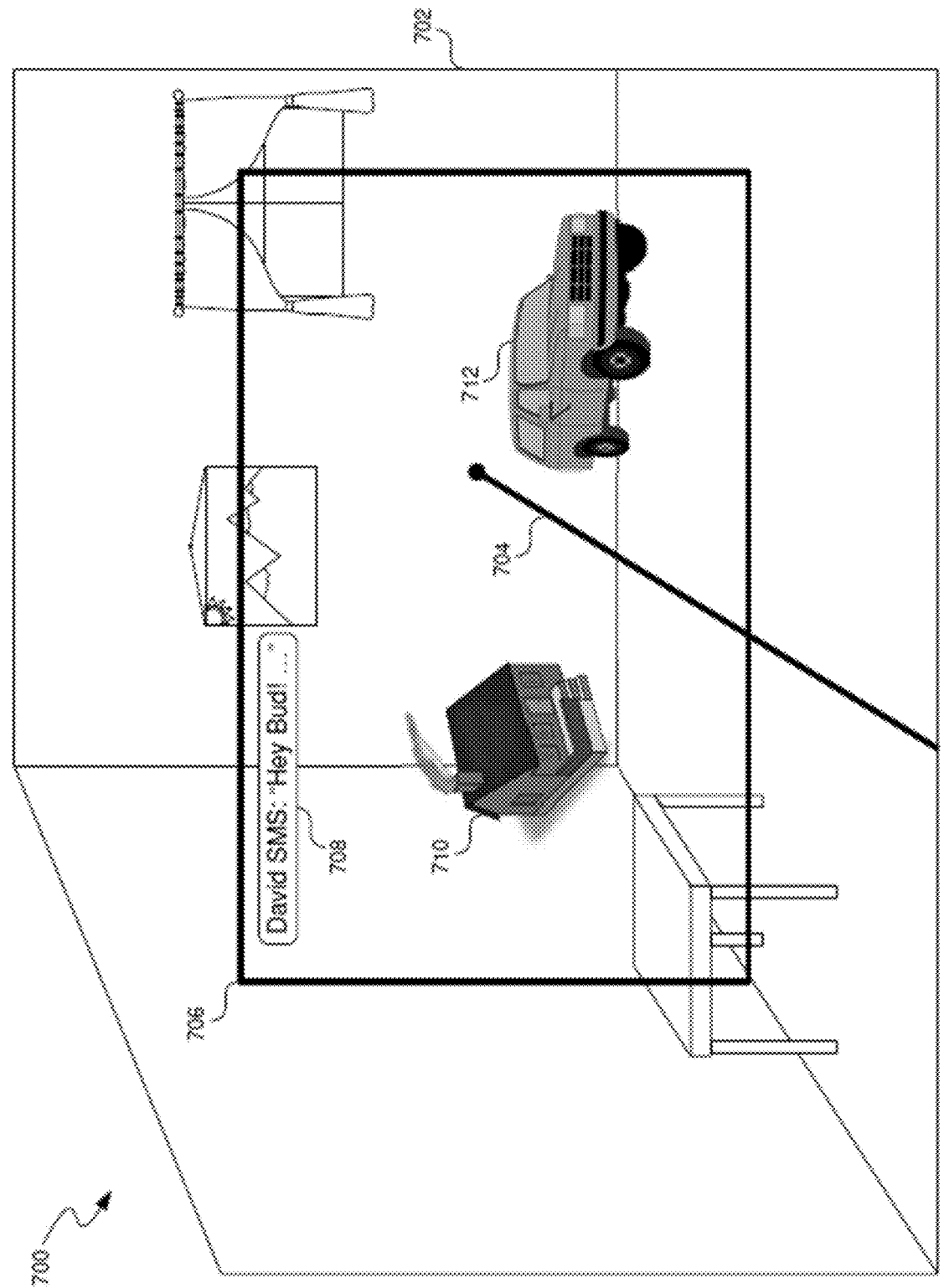
FIGS. 7A and 7B are conceptual diagrams illustrating an example of minimizing virtual objects in response to field-of-view maximums being reached.
Figure 7B:
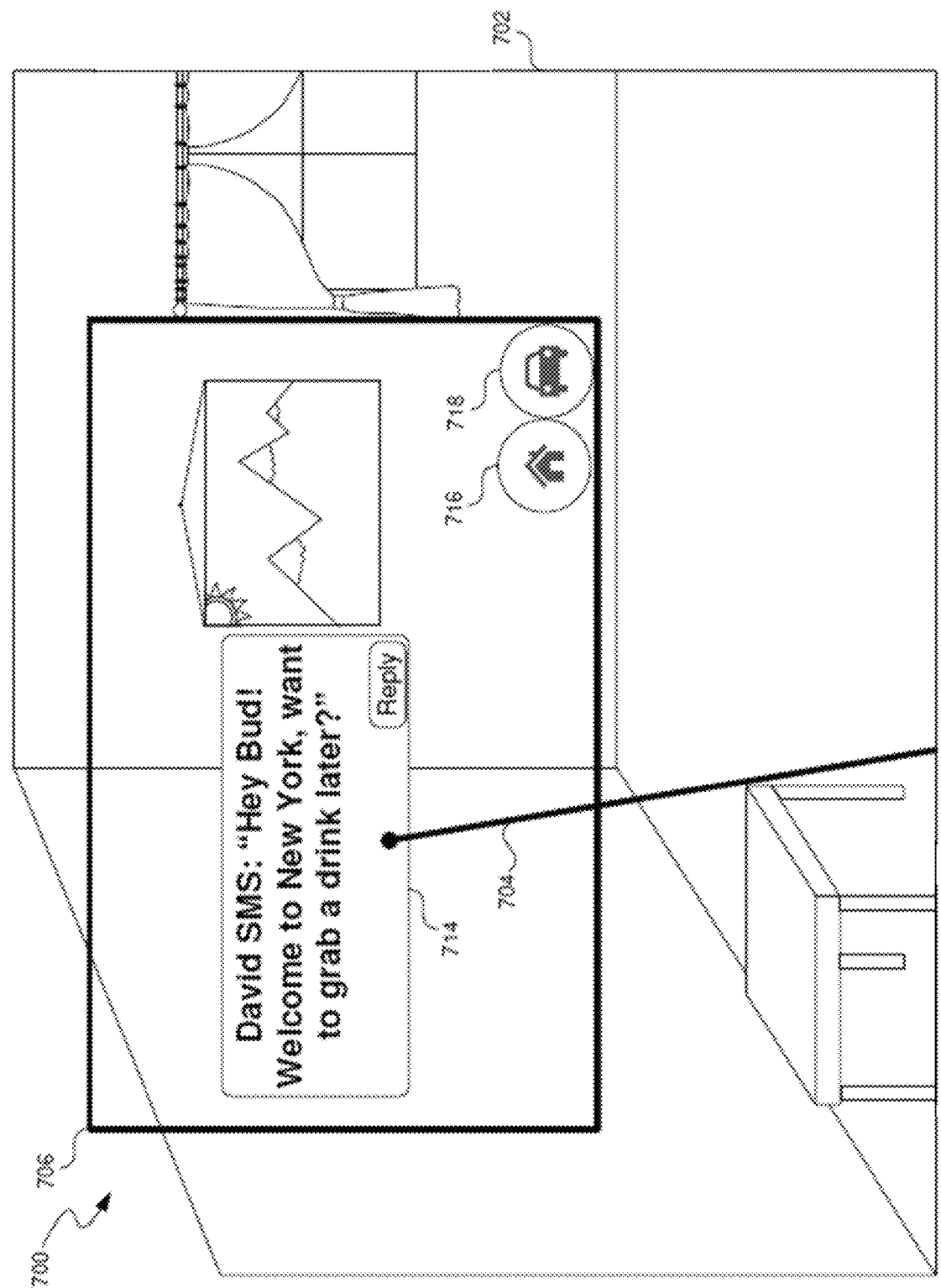

FIGS. 7A and 7B are conceptual diagrams illustrating an example 700 of minimizing virtual objects in response to field-of-view maximums being reached. Example 700 begins in FIG. 7A showing an artificial reality environment 702, a user's gaze direction 704, a user's field of view 706, minimized notification 708, a first virtual object 710, and a second virtual object 712. In FIG. 7B, the user's gaze 704 has moved to the minimized notification 708, causing it to change into a maximized notification 714 (as discussed above). Because the maximized notification 714, first virtual object 710, and second virtual object 712 take up more than a maximum amount of the user's field of view (in this case 35%), the artificial reality notification system minimizes virtual objects 710 and 712 into icon-only versions 716 and 718, which it moves to a corner of the user's field of view 706.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A non-transitory computer-readable storage medium storing instructions that, when executed by a computing system, cause the computing system to perform a process for implementing an artificial reality look to pin interaction modality for a notification, the process comprising:
    displaying a minimized version of the notification as head leashed at a pre-defined location in an artificial reality device's field of view;
    determining that a tracked user's gaze is directed at the minimized version of the head leashed notification and, in response, transitioning the notification to be maximized and world locked, wherein the maximized and world locked version of the notification appears to a user as not changing position while the user rotates the user's head,
        wherein the tracked user's gaze is tracked based on modeling of a user's eye position in relation to the user's cornea and wherein the user's gaze is directed to a display;
    in response to the transitioning the notification to be maximized and world locked, determining that the maximized and world locked notification and one or more other virtual objects in the artificial reality device's field of view take up more than a threshold amount of the artificial reality device's field of view; and
    in response to the determination that the maximized and world locked notification and the one or more other virtual objects in the artificial reality device's field of view take up more than the threshold amount of the artificial reality device's field of view, converting the one or more other virtual objects into minimized versions or removing the one or more other virtual objects from the artificial reality environment.

2. The non-transitory computer-readable storage medium of claim 1, wherein the minimized version of the notification includes one or more of:
    an indication of a user and/or application source of the notification;
    a preview of the content of the notification;
    a time associated with receipt of the notification;
    controls for responding to or dismissing the notification; or
    any combination thereof.

3. The non-transitory computer-readable storage medium of claim 1, wherein the determining that the tracked user's gaze is directed at the minimized version of the head leashed notification is based on a determination that a timer for showing the minimized version of the head leashed notification has not expired.

4. The non-transitory computer-readable storage medium of claim 1, wherein the process further comprises:
    moving an indication of the one or more other virtual objects to a separate interface.

5. The non-transitory computer-readable storage medium of claim 1, wherein the maximized version of the notification includes one or more of:
    a message from the notification;
    graphics or 3D models included in the notification;
    controls or input fields for responding to the notification; or
    any combination thereof.

6. The non-transitory computer-readable storage medium of claim 1, wherein the transitioning the notification to be maximized and world locked includes transitioning the notification to be maximized and 3DoF world locked such that the user's apparent distance and angle to the notification stays the same as the user moves closer to and farther from the notification or moves around the notification.

7. The non-transitory computer-readable storage medium of claim 1, wherein the transitioning the notification to be maximized and world locked includes transitioning the notification to be maximized and 6DoF world locked such that the user's apparent distance and angle to the notification is adjusted as the user moves closer to closer to and farther from the notification or moves around the notification.

8. A computing system for implementing a look to pin interaction modality for a notification, the computing system comprising:
    one or more processors; and
    one or more memories storing instructions that, when executed by the one or more processors, cause the computing system to perform a process comprising:
        displaying a first version of the notification as head leashed in an artificial reality device's field of view;
        determining that a tracked user's gaze is directed at the first version of the head leashed notification and, in response, transitioning the notification to be in a second version and world locked, wherein the second and world locked version of the notification appears to a user as not changing position while the user rotates the user's head, and wherein the transitioning the notification to be the second and world locked version includes transitioning the notification to be 3DoF world locked such that the user's apparent distance and angle to the notification stays the same as the user moves closer to and farther from the notification or moves around the notification; and in response to a detected trigger, dismissing the notification or returning the notification to being the first and head leashed version.

9. The computing system of claim 8, wherein the first version of the notification includes one or more of:
an indication of a user and/or application source of the notification;
a preview of the content of the notification;
a time associated with receipt of the notification;
controls for responding to or dismissing the notification; or
any combination thereof.

10. The computing system of claim 8, wherein the determining that the tracked user's gaze is directed at the first version of the head leashed notification is based on a determination that a display timer for showing the first version of the head leashed notification has not expired.

11. The computing system of claim 8, wherein the tracked user's gaze is tracked based on modeling of a user's eye position in relation to a determined position of the user's cornea.

12. The computing system of claim 8, wherein the second version of the notification includes one or more of:
a message from the notification;
graphics or 3D models included in the notification;
controls or input fields for responding to the notification; or
any combination thereof.

13. The computing system of claim 8, wherein the process further comprises:
in response to the transitioning the notification to be the second and world locked version, determining that the second and world locked notification version and one or more other virtual objects in the artificial reality device's field of view take up more than a threshold amount of the artificial reality device's field of view; and
in response to the determination that the second and world locked notification version and the one or more other virtual objects in the artificial reality device's field of view take up more than the threshold amount of the artificial reality device's field of view, converting the one or more other virtual objects into minimized versions or removing the one or more other virtual objects from the artificial reality environment.

14. A method for implementing a look to pin interaction modality for a notification, the method comprising:
displaying a first version of the notification as head leashed in an artificial reality device's field of view;
determining that a tracked user's gaze is directed at the first version of the head leashed notification for a threshold amount of time and, in response, transitioning the notification to be in a second version and world locked, wherein the second and world locked version of the notification appears to a user as not changing position while the user rotates the user's head, and wherein the transitioning the notification to be second and world locked version includes transitioning the notification to be 6DoF world locked such that the user's apparent distance and angle to the notification is adjusted as the user moves closer to and farther from the notification or moves around the notification; and in response to a detected trigger, dismissing the notification or returning the notification to being the first and head leashed version.

15. The method of claim 14, wherein the second version of the notification includes one or more of:
a message from the notification;
graphics or 3D models included in the notification;
controls or input fields for responding to the notification; or
any combination thereof.

16. The method of claim 14, further comprising:
in response to the transitioning the notification to be the second and world locked version, determining that the second and world locked notification version and one or more other virtual objects in the artificial reality device's field of view take up more than a threshold amount of the artificial reality device's field of view; and
in response to the determination that the second and world locked notification version and the one or more other virtual objects in the artificial reality device's field of view take up more than the threshold amount of the artificial reality device's field of view, moving an indication of the one or more other virtual objects to a separate interface.

17. The method of claim 14 further comprising:
in response to the transitioning the notification to be the second and world locked version, determining that the second and world locked notification version and one or more other virtual objects in the artificial reality device's field of view take up more than a threshold amount of the artificial reality device's field of view; and
in response to the determination that the second and world locked notification version and the one or more other virtual objects in the artificial reality device's field of view take up more than the threshold amount of the artificial reality device's field of view, converting the one or more other virtual objects into minimized versions or removing the one or more other virtual objects from the artificial reality environment.

18. The method of claim 14, wherein the tracked user's gaze is tracked based on modeling of a user's eye position in relation to a determined position of the user's cornea.

19. The method of claim 14, wherein the determining that the tracked user's gaze is directed at the minimized version of the head leashed notification is based on a determination that a timer for showing the minimized version of the head leashed notification has not expired.

\* \* \* \* \*